Nov. 1, 1932.　　　E. R. ST. JOHN　　　1,885,781
ROOF SUPPORT FOR BUILDINGS
Filed Feb. 19, 1929　　　6 Sheets-Sheet 1
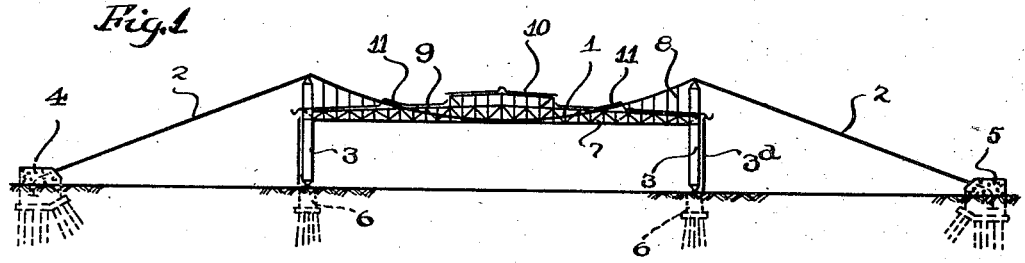
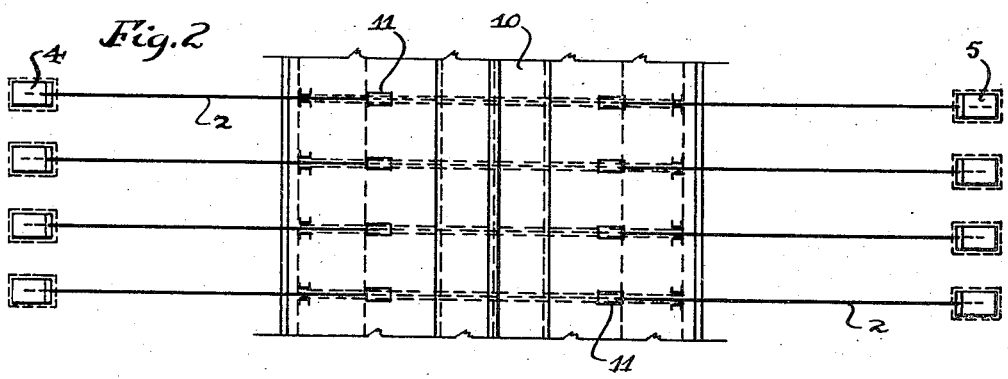
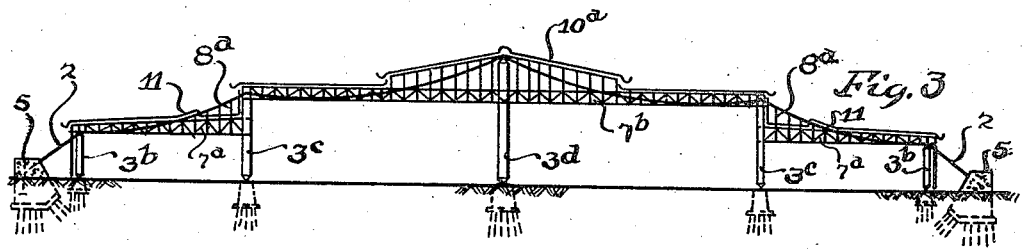
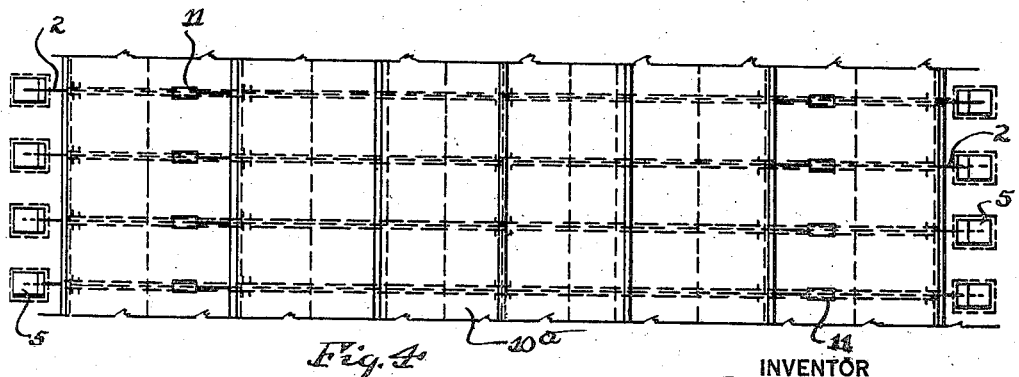
INVENTOR
Erastus Root St. John
BY
his ATTORNEY

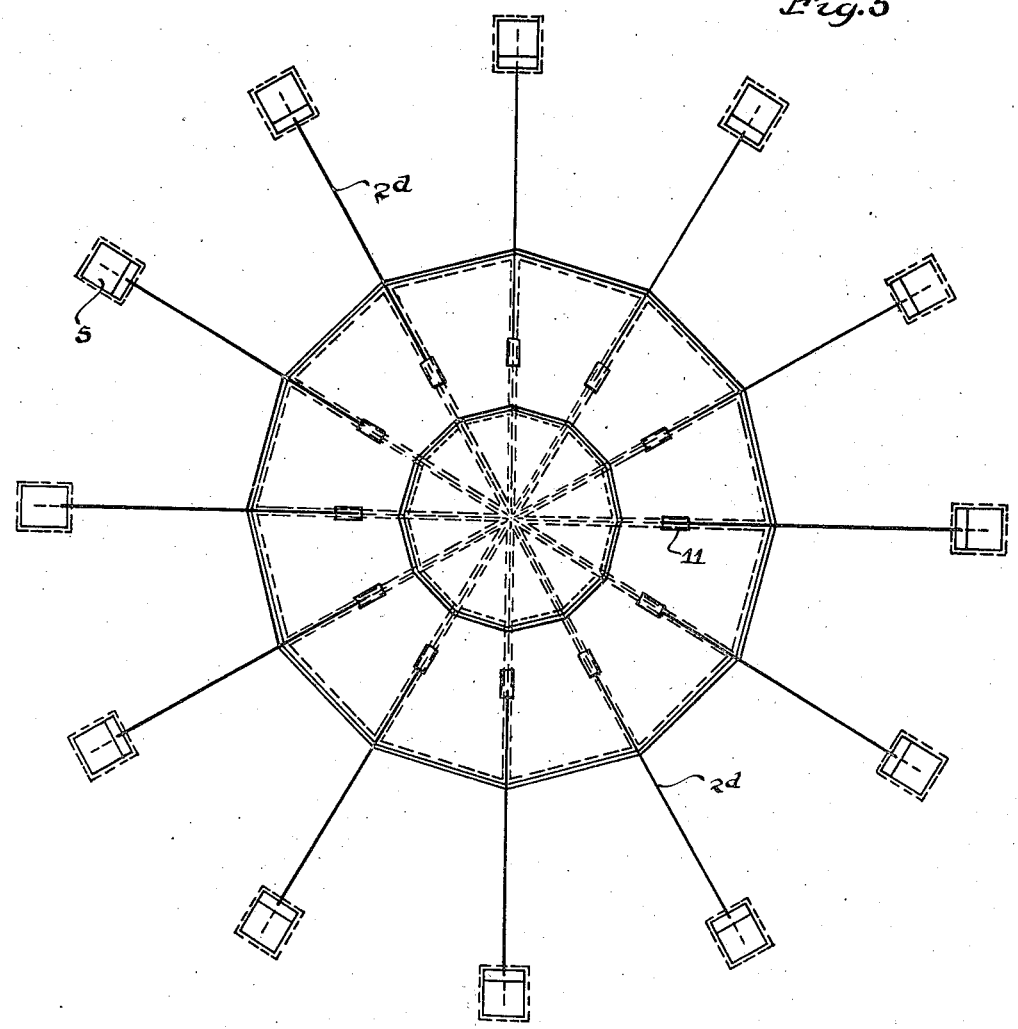
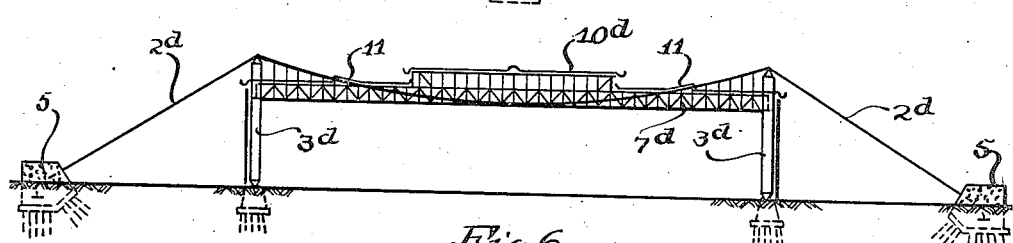

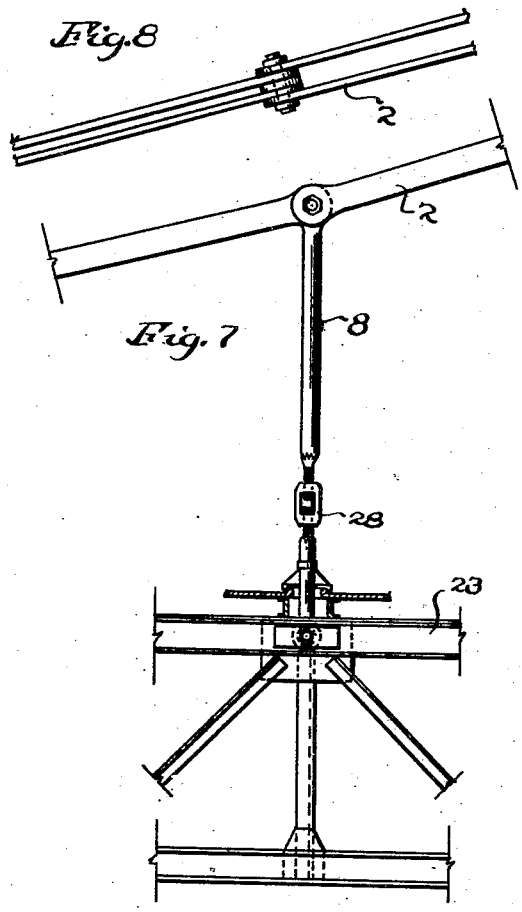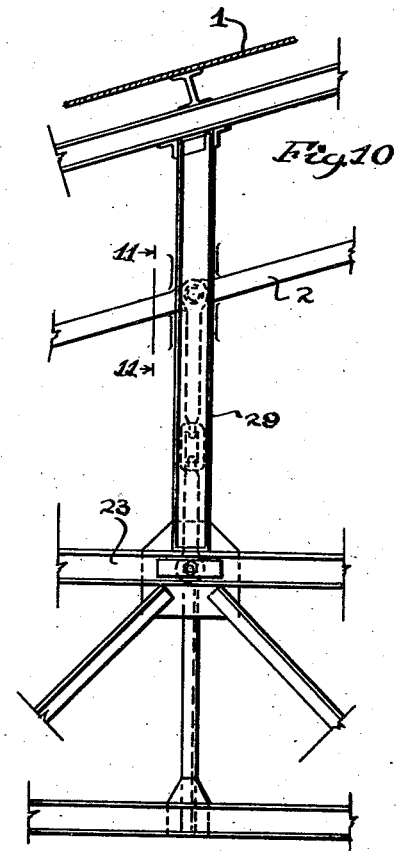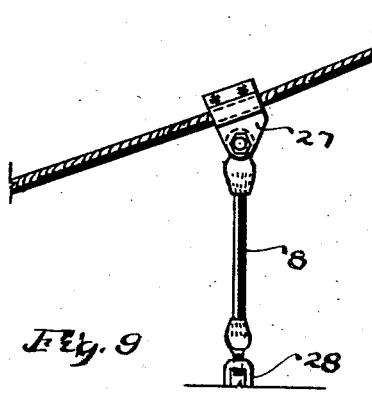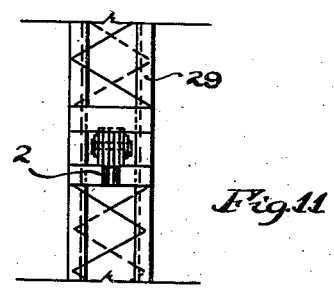

Nov. 1, 1932.　　　E. R. ST. JOHN　　　1,885,781
ROOF SUPPORT FOR BUILDINGS
Filed Feb. 19, 1929　　　6 Sheets-Sheet 4
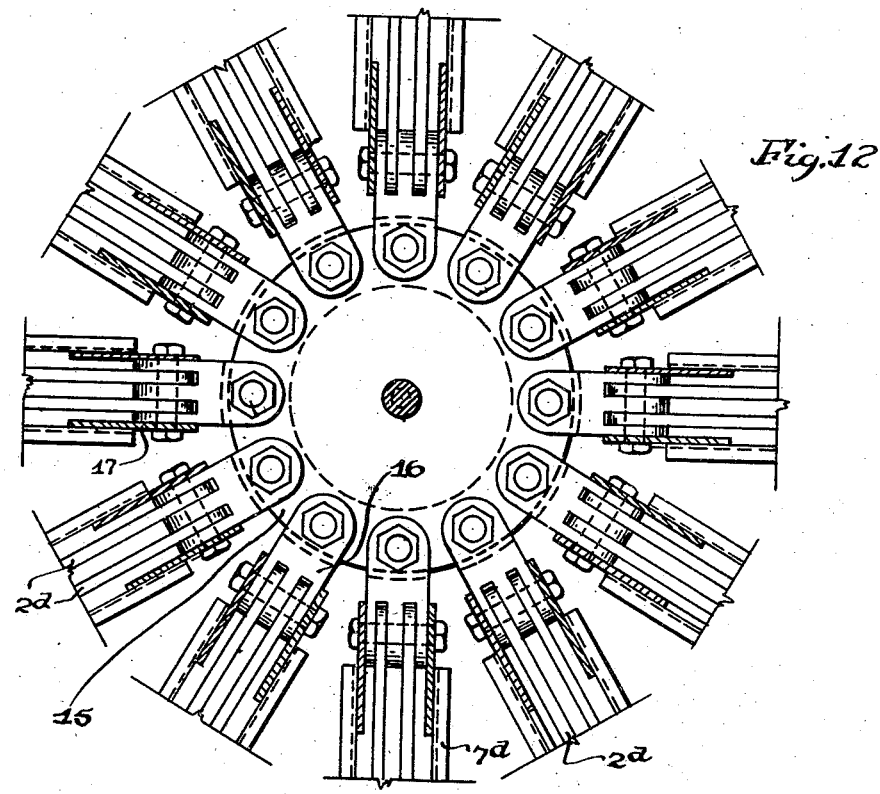
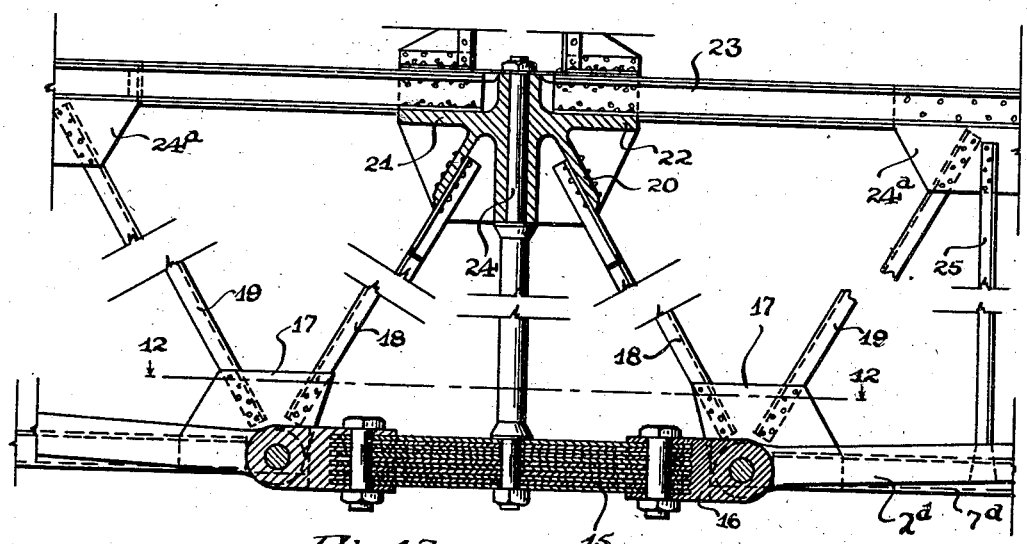
INVENTOR
Erastus Root St. John
BY
his ATTORNEY

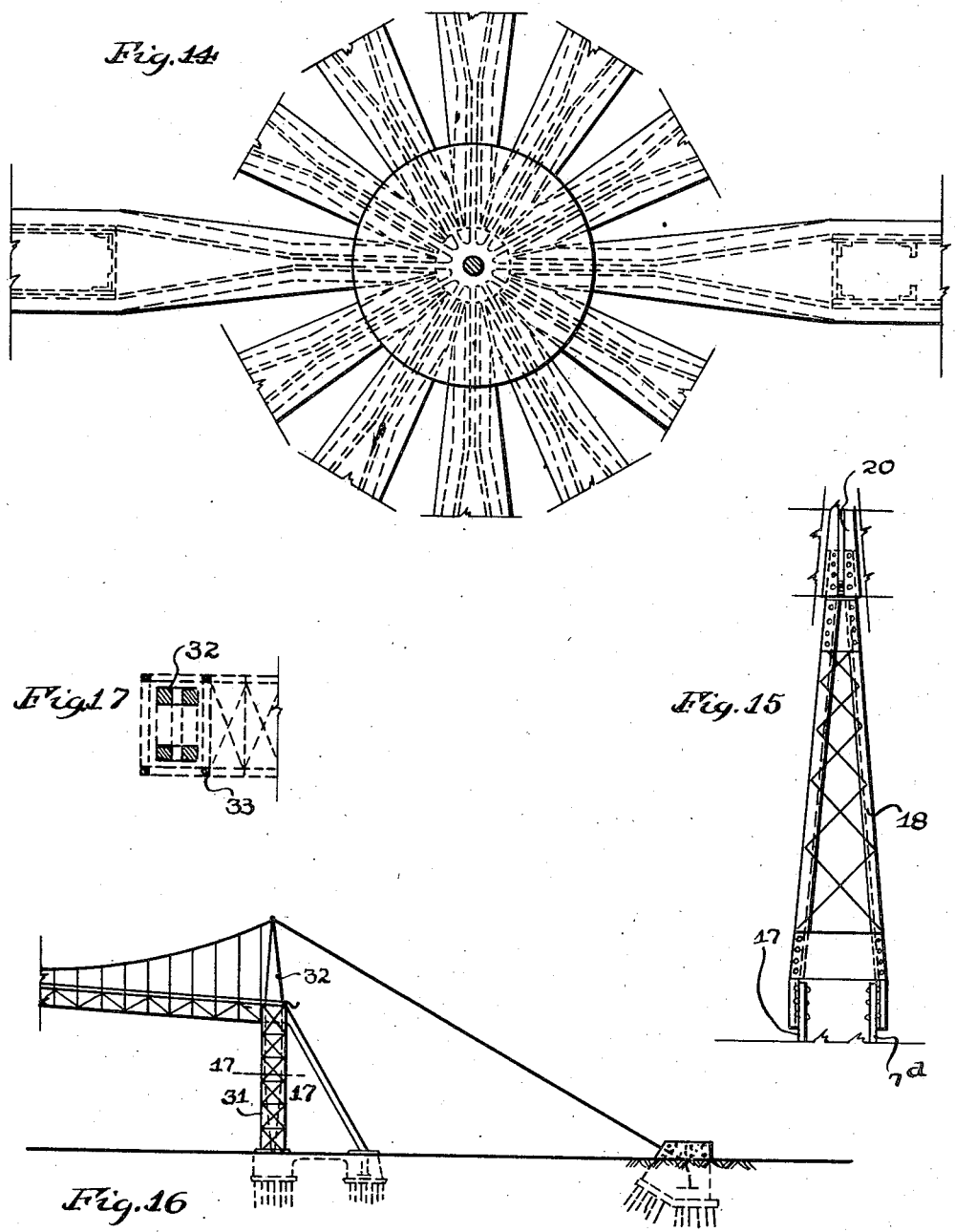

Patented Nov. 1, 1932

1,885,781

UNITED STATES PATENT OFFICE

ERASTUS ROOT ST. JOHN, OF NEW YORK, N. Y.

ROOF SUPPORT FOR BUILDINGS

Application filed February 19, 1929. Serial No. 341,161.

This invention relates to a roof support for buildings, especially the roofs of large buildings in which intermediate posts or columns are undesirable. The object of this invention is to provide a simple construction for supporting the roofs of buildings from cables having their ends anchored to the ground and supported on suitable towers. A further object of the invention is to provide means for supporting the roofs of buildings of this kind in which the cables sag to the normal equilibrium curve between the towers and are stiffened by means of trusses or girders for preventing undue distortions or oscillations and supporting the roof.

To these and other ends, the invention consists of certain parts and combinations of parts, all of which will be hereinafter described: the novel features being pointed out in the appended claims.

In the drawings:

Fig. 1 is a cross section of a single aisle building having a long roof span and constructed according to one embodiment of the invention;

Fig. 2 is a fragmentary plan view of the structure shown in Fig. 1;

Fig. 3 is a cross section of a structure having a plurality of aisles illustrating another application of the invention;

Fig. 4 is a fragmentary plan view of the structure shown in Fig. 3;

Fig. 5 is a plan view of a polygonal building illustrating still another application of the invention;

Fig. 6 is a diametrical section of the structure shown in Fig. 5;

Fig. 7 illustrates one method of supporting the stiffening trusses and roof from an I-bar cable;

Fig. 8 is a plan view of an I-bar cable;

Fig. 9 shows a method of securing wire cables to the hangers;

Fig. 10 is a detail view showing the method of supporting the roof above the cables;

Fig. 11 is a section on the line 11—11, Fig. 10;

Fig. 12 is a detail view of a central hub to which the cables of a polygonal building are attached, the view being a section on the line 12—12; Fig. 13;

Fig. 13 is a detail view in sectional elevation showing the central cable and girder hubs and the connections between them;

Fig. 14 is a fragmentary plan view with parts in section;

Fig. 15 is a view in elevation showing how the center diagonals of the stiffening trusses converge inward to connect to the top chord, hub or spider;

Fig. 16 is a sectional elevation of a cable, stiffening truss and tower;

Fig. 17 is a cross section of the supporting tower on the line 17—17, Fig. 16;

Figure 18:
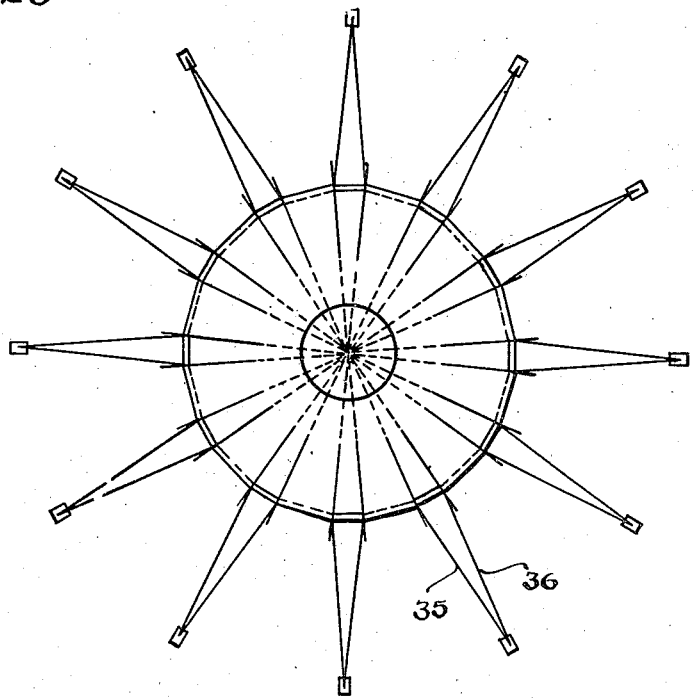
Fig. 18 is a diagrammatic plan view of a polygonal shaped building showing an application of the invention in which a pair of cables are secured to each anchor.

Although several applications of the invention are illustrated in the drawings, the main features of construction are common to all of them. It is often desired to construct buildings covering large areas, such as hangars for Zeppelins or aeroplanes, in which the interior is free from obstructing posts or pillars. By the present invention it is proposed to suspend the roof of such a building from cables anchored to the ground at some distance from the building, supported between towers or posts in or adjacent the sides of the building and between which the roof is carried or suspended.

Figs. 1 and 2 illustrate a single aisle building having a roof 1 suspended from a plurality of cables 2, each supported on posts or towers 3 arranged adjacent the side walls 3ª of the building and projecting vertically above the walls and anchored at its ends at 4 and 5 at some distance from opposite sides of the building. The posts or towers 3 are set on suitable foundations 6 and arranged for slight movement in the plane of the cable to allow for expansion and contraction due to temperature or load changes. The middle portion of each of the cables is arranged in reinforcing or stiffening trusses 7 which are supported on or suspended from the cables by means of hangers 8 and on which the roof 9 is carried. The central portion may be provided with the monitor 10. It will be noted that in this construction the cables are arranged above the roof along the sides and pass through the roof between the sides and middle of the roof through openings which are closed by weatherproof covers or hoods 11.

Referring to Figs. 3 and 4, in which is illustrated a construction involving a building having a plurality of aisles, four being illustrated, the cables 2 are anchored at 5 and arranged over the supporting towers or posts $3^b$, $3^c$ and $3^d$, there being a pair of posts $3^b$ arranged adjacent the outer sides of the building and a pair of taller posts $3^c$ arranged between the posts $3^b$ and the middle post $3^d$ which is taller than the posts $3^c$. Between the posts $3^b$ and $3^c$, $3^c$ and $3^d$ on each side of the middle of the building are formed the aisles extending longitudinally thereof. In this form the roof is arranged in sections, the sections over the side aisles being lower than the section over the center aisle, and supported on stiffening trusses $7^a$ suspended from those portions of the cables between the posts $3^b$ and $3^c$ by means of hangers $8^a$. The openings through which the cables enter the roof being closed by means of weatherproof hoods 11. The stiffening trusses $7^b$ for the middle or central roof section may be of a single span arranged between the posts or towers $3^c$ and engaging the central post $3^d$ and supported on that portion of the cable between the posts $3^c$. The middle of the central section is provided with a monitor $10^a$.

In the form of construction illustrated in Figs. 5, 6 and 12 to 15 inclusive, the main cables $2^d$ are arranged radially about a center and anchored to the ground at diametrically opposite points 5. This arrangement provides for a many sided building, twelve sides being shown. Doors or entrances may be provided between each adjacent pair of cables so that entrance may be had from substantially any direction. This form of structure is particularly valuable for Zeppelin hangars. These machines must be landed in a direction parallel to the direction of the wind. Such a construction always provides one or more entrances which are normal to the direction of the wind. Each of the cables $2^d$ is supported on diametrically arranged posts $3^d$ adjacent or in the outer wall of the building and all the posts or towers of the building are circumferentially arranged about its center. The girder stiffening trusses $7^d$ may be arranged diametrically between the posts $3^d$ being radially connected with each other at the center and suspended from the main cables $2^d$. As in the forms shown in Figs. 1 to 4, the roof is supported on these trusses, and a polygonal monitor $10^d$ may be arranged over the center.

A simple method for arranging the cables and girders at the center is shown in Figures 12 and 13. In this construction, a central hub or spider 15 is arranged at the center and the main cables are each formed of two pieces, one end of each being secured to the hub at diametrically opposite sides and the other ends being secured to diametrically opposite ground anchors.

By this arrangement all the cables are maintained in the same plane at the center of the building irrespective of temperature changes or other stresses. This central hub may be cast in a single piece, but to eliminate latent imperfections frequent in large castings, the laminated construction illustrated is to be preferred. A suitable means for connecting the cables to the hub or spider comprises a shackle 16, a plurality of which are bolted or otherwise secured to the hub at diametrically opposite points around its periphery, one pair being employed for each of the main cables $2^d$. To the outer ends of the devices the main cables are secured by means of bolts or otherwise. Although I-bar cables are illustrated in the drawings, it will be understood that other forms of cables, as, wire cables can be connected to the central hub without departing from the spirit or scope of the invention.

The stiffening trusses $7^d$ are supported on the cables, as previously described and may also be connected to the hub 15 by any suitable means. In the construction illustrated, the inner ends of the horizontal truss chords or girders are provided with connecting plates 17 which are bolted or otherwise secured to the shackles 16 mounted on the hub. By this construction the hub or spider serves as a common center link for all of the cables and also as a common connecting member or center panel for the lower horizontal chords of the stiffening trusses. In the construction illustrated the diagonal truss members 18 and 19 are suitably secured to the gusset plates 17 as by rivets and the inwardly inclined truss members 18 are secured at their upper ends to downwardly depending flanges 20 of a central truss hub 21. The hub 21 is provided with horizontal flanges 22 to which are secured the upper girders or top chords 23 of the truss. It will be apparent that the hub 21 is substantially concentric with the spider 15, arranged vertically above the same, and is connected thereto by means of a rod 24 passing through central openings in said hubs and having means for fixing the hub against longitudinal movement thereon. This serves to relieve the connection between the cables $2^d$ and the lower spider 15 from strains or stresses tending to distort them. The sides of the inclined truss members 18 converge toward the center as clearly shown in Fig. 15. The truss members 19 incline upwardly and outwardly from the gusset plates 17 and at their upper ends are secured to gusset plates $24^a$ secured to the upper top chord truss member 23, and to which the upper ends of vertical truss members 25 are also secured. The lower ends of the vertical members are connected to the lower horizontal truss members. This construction provides a rigid truss support for the roofs of polygonal or multi-sided structures which is substantially a unit construction secured to and supported on the main cables all of which are maintained substantially the same horizontal plane at the center.

In Figs. 7 to 11 inclusive there is shown in detail a simple method for supporting or suspending the truss and roof on the main cables. Referring to Fig. 7, a hanger 8 is shown pivotally suspended from the main cable 2, an I-bar cable being shown although it can readily be suspended on a wire cable by means of a clamp 27 as shown in Fig. 9; and at its lower end is pivotally connected with the upper chord 23 of the truss. Owing to temperature changes, the lengths of the cables and truss bars are not constant and the pivotal connections of the hangers allows them to swing from the vertical to compensate for such changes. In assembling there may be slight variations in the distances between the cable and the truss and to allow for these variations, sleeve nuts 28 are provided on the hangers 8 for making slight adjustments in the lengths thereof. Fig. 10 shows a similar construction in which the roof is supported above the main cable 2. In this construction an upright shaft 29 rises from the upper chord 23 of the truss to a point above the main cable where the roof is supported. The hangers may be mounted within the shaft, as shown, and provision made for relative vertical movement between the cable and the shaft as shown in Fig. 11.

In Figs. 16 and 17 there is shown a post 31 for sustaining the side walls independently of the roof supporting tower 32. The roof or cable support is shown as comprising four columns suitably braced to each other and built around this tower but independent thereof is the side wall post, also comprising four columns 33 suitably braced to each other.

Figure 19:
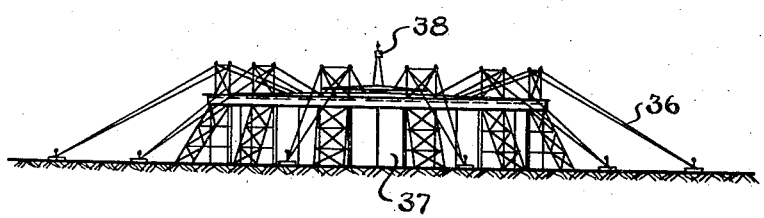
Fig. 19 shows an elevation of the same.

In Figs. 18 and 19 there is shown a Zeppelin hangar illustrating one application of the invention. In this construction two main cables 35 and 36 are secured to each ground anchor and extend over a pair of connected supporting towers to a central hub or spider and between the adjacent towers are provided doors or entrances 37. A tower 38 rises from the center of the roof providing a convenient observation tower, radio room and support for a beacon light. Guide lights are mounted on the anchors and the tops of the supporting towers provide convenient positions for search lights.

It will be noted that this invention provides an economical and efficient method for supporting the roofs of long span buildings of one or more aisles by means of cables having their ends anchored at convenient distances from the sides of the building and supported on intermediate towers or posts conveniently arranged in the sides of the building. These cables being reinforced or stiffened against vibrations or distortions by means of suitable rigid trusses or girders. A structure is thus provided which may have comparatively long and wide aisles entirely free from such obstructions, as posts, braces or other roof supporting devices.

It will also be noted that this invention provides an economical and comparatively simple construction for buildings of polygonal form having many sides, such as hexagonal, octagonal, etc., covering comparatively large areas and free from internal obstructions. In such structures, the cables extend radially from the center over the cable supports to the ground anchors arranged circumferentially about the center and in pairs, the numbers of each pair being arranged diametrically opposite each other, the stiffening trusses on which the roof is supported being formed as a unit of girders and arranged within the circle of cable supporting towers.

What I claim as my invention and desire to secure by Letters Patent is:

1. A roof support for buildings comprising in combination a cable anchored at its opposite ends, spaced uprights on which the cable is hung, a continuous rigid truss connecting the upright supports for stiffening the cable, hangers connected to the cable and truss at frequent intervals, and upright struts supported on the rigid truss unconnected to the cable or to the hangers to support a roof framing and a roof over certain portions of the cable.

2. A roof support for buildings comprising in combination a series of parallel cables anchored at their opposite ends, spaced uprights on which the cables are hung, continuous rigid trusses arranged between each pair of uprights for stiffening the cables and hangers connected to the cables and trusses at frequent intervals, and upright struts supported on the rigid trusses but unconnected to the cables or to the hangers to support a roof framing and a roof over certain portions of the cables and over certain of the spaced uprights.

3. A roof support for buildings comprising in combination a series of parallel cables anchored at their opposite ends, at least three spaced uprights on which each cable is hung, a continuous rigid truss arranged between each pair of spaced uprights for stiffening the cables, hangers spaced at frequent intervals and connected to the cables and trusses, and upright struts supported on the rigid trusses but unconnected to the cables or to the hangers to support a roof framing and a roof above certain portions of the cables and over certain of the spaced uprights.

4. A roof support for circular and polygonal shaped buildings comprising a central spider, cables having their inner ends secured to the spider in a single plane and radiating therefrom, pairs of diametrically spaced uprights on which the cables are hung, and continuous rigid trusses arranged between each pair of diametrically spaced uprights and having their bottom chords divided into two parts each connected to the spider in the plane of the inner ends of the cables.

5. A roof support for circular and polygonal shaped buildings comprising a central spider, horizontal bolts supported by the spider in a single plane, cables radiating from the spider and secured at their inner ends by the bolts, pairs of diametrically spaced uprights on which the cables are hung, and continuous rigid trusses each arranged between a pair of uprights and connected to the spider.

6. A roof support for circular and polygonal shaped buildings comprising a central spider, horizontal bolts supported by the spider in a single plane, cables radiating from the spider and secured at their inner ends by the bolts, pairs of diametrically spaced uprights on which the cables are hung, and continuous rigid trusses each arranged between a pair of uprights and having its bottom chord divided into two parts each secured to a horizontal bolt securing the inner end of one of the cables.

7. A roof support for circular and polygonal shaped buildings comprising a central spider, shackles, vertical bolts connecting the shackles to the spider in radiating relation in the same horizontal plane, horizontal bolts carried by the shackles in the same horizontal plane, radiating cables having their inner ends secured to the horizontal bolts, uprights arranged in pairs and each having one of the cables hung therefrom, and continuous rigid trusses arranged between each pair of diametrically spaced uprights and having their bottom chords divided into two parts each connected to one of the horizontal bolts.

8. A roof support for circular and polygonal shaped buildings comprising a central spider formed of a plurality of superimposed plates, shackles, vertical bolts passing through the plates and the shackles and securing the latter to the plates in the same plane, horizontal bolts carried by the shackles, radiating cables having their inner ends secured to the horizontal bolts, uprights arranged in diametric pairs and each having one of the radiating cables hung therefrom, and continuous rigid trusses each arranged between a pair of uprights and having its bottom chord divided into two parts, each of which is connected to one of the horizontal bolts.

9. A roof support comprising a central spider, horizontal pins supported by the spider in the same horizontal plane, cables secured to the pins and radiating from the spider, uprights arranged in diametric pairs and supporting the cables, rigid trusses each connecting the members of a pair of uprights and having its bottom chord formed of two parts each connected to one of the horizontal pins, an upper spider supported in rigid relation to the first mentioned spider and having the upper chords of the trusses rigidly secured thereto, and braces extending from the upper spider to the horizontal pins of the lower spider.

ERASTUS ROOT ST. JOHN.